(12) United States Patent
McDonald-Maier et al.

(10) Patent No.: US 7,281,162 B2
(45) Date of Patent: Oct. 9, 2007

(54) PROGRAM-CONTROLLED UNIT

(75) Inventors: Klaus D. McDonald-Maier, Biberach (DE); Dietmar Konig, Munich (DE); Andreas Kolof, Grobenzell (DE); Albrecht Mayer, Deisenhofen (DE)

(73) Assignee: Infineon Technologies AG, Neubiberg (DE)

( * ) Notice: Subject to any disclaimer, the term of this patent is extended or adjusted under 35 U.S.C. 154(b) by 422 days.

(21) Appl. No.: 10/475,600

(22) PCT Filed: Apr. 9, 2002

(86) PCT No.: PCT/DE02/01296

§ 371 (c)(1),
(2), (4) Date: May 6, 2004

(87) PCT Pub. No.: WO02/086728

PCT Pub. Date: Oct. 31, 2002

(65) Prior Publication Data

US 2004/0205410 A1 Oct. 14, 2004

(30) Foreign Application Priority Data

Apr. 20, 2001 (DE) .............................. 101 19 265

(51) Int. Cl.
*G06F 11/00* (2006.01)

(52) U.S. Cl. .......................................... 714/30; 714/31

(58) Field of Classification Search ................. 714/30, 714/31
See application file for complete search history.

(56) References Cited

U.S. PATENT DOCUMENTS

| | | | |
|---|---|---|---|
| 6,094,729 A | 7/2000 | Mann | |
| 6,185,732 B1 | 2/2001 | Mann et al. | |
| 6,345,295 B1 * | 2/2002 | Beardsley et al. | 709/224 |
| 6,681,321 B1 * | 1/2004 | Dale et al. | 712/227 |
| 6,708,173 B1 * | 3/2004 | Behr et al. | 707/10 |
| 6,754,890 B1 * | 6/2004 | Berry et al. | 717/128 |
| 2002/0138788 A1 * | 9/2002 | Yenne et al. | 714/38 |
| 2004/0210877 A1 * | 10/2004 | Sluiman et al. | 717/130 |

FOREIGN PATENT DOCUMENTS

| | | |
|---|---|---|
| EP | 1016969 A2 | 7/2000 |
| EP | 1058189 A2 | 12/2000 |
| EP | 1091298 A2 | 4/2001 |
| WO | WO00/63777 A1 | 10/2000 |

* cited by examiner

*Primary Examiner*—Michael Maskulinski
(74) *Attorney, Agent, or Firm*—Dickstein, Shapiro, LLP.

(57) ABSTRACT

A program-controlled unit (e.g., a microcontroller) in which trace information (e.g., selected addresses, data and/or control signals) that is processed by a core and which can be used to trace the profile of the processes occurring within the program-controlled unit, are stored and/or output from the program-controlled unit along with corresponding identification codes that are used by an external debugging system to identify the trace information.

25 Claims, 1 Drawing Sheet

PROGRAM-CONTROLLED UNIT

FIELD OF THE INVENTION

The present invention pertains generally to program-controlled units (i.e., digital processor devices). More specifically, the present invention relates to a method and structure for improving the generation of trace information in such program-controlled units.

BACKGROUND OF THE INVENTION

Program-controlled units such as microprocessors, microcontrollers, signal processors, etc., have been known in numerous forms for many years.

A known problem of program-controlled units is that, in many cases, faults (operating errors or "bugs") that occur during execution of a software program cannot be readily localized and/or remedied.

One previously used (and in some cases still used) approach for localizing and remedying faults occurring in a program-controlled unit is to produce a special "bond-out" version of the program-controlled units that are used for program development. Bond-out versions of program-controlled units are specially-produced in small batches, and differ from the standard mass-produced versions of the respective program-controlled units in that they include more input and/or output terminals, and the additional input and/or output terminals are connected to locations on the program-controlled unit that are not freely accessible in the standard version of the program-controlled unit. Typically, these additional input/output terminals are connected to the processor core of the bond-out version. As a result, information on internal states or processes of the program-controlled unit (e.g., addresses, data and/or control signals generated in the processor core, such as the respective current state of the program counter) that are typically not accessible in the standard version, can be output from the bond-out program-controlled unit, and evaluated outside the program-controlled unit. By evaluating the information it is possible to trace the profile of the processes occurring within the program-controlled unit, as a result of which faults occurring in the program-controlled unit can be localized and corrected.

However, the use of bond-out versions is associated with a series of disadvantages. In particular, the bond-out versions of program-controlled units are larger and more expensive than the standard production versions and, what is more important, the bond-out versions generally do not behave in precisely the same way as the standard versions. Therefore, problems that occur in bond-out versions may not arise in corresponding standard production versions, and problems may arise in the standard production versions that do not arise in corresponding bond-out versions.

For this reason, in some cases, another approach has been adopted in which standard production version program-controlled units are equipped with on-chip debug resources that facilitate the extraction of information from the program-controlled unit core for debugging purposes. These on-chip resources also facilitate outputting ("off-loading") the extracted information from the program-controlled unit, or storing the extracted information in special memory arrays provided on the program-controlled unit. The outputting and/or storing operations are performed using an interface that includes only a small number of pins, which in some cases are also be used for other purposes.

FIG. 2 is a simplified block diagram showing a conventional program-controlled unit (microprocessor) 200. Program-controlled unit 200 is a microcontroller and comprises a core C, peripheral units P1, P2, P3 which are connected to the core C via a first bus BUS1, storage devices S1, S2, S3 which are connected to the core C via a second bus BUS2, debug resources DR which are connected to the core C, and an interface SS which is assigned to the debug resources DR, and via which the debug resources DR output data that is to be output to an external device and via which the debug resources DR are controlled by the external device (not shown).

The peripheral units P1 to P3 are, for example, an A/D converter, a timer, a coder, a compression device, a Controller Area Network (CAN) interface, or other units that can be integrated into microcontrollers, and the storage devices are, for example, a RAM, a ROM and a flash memory.

The debug resources DR are preferably capable of outputting what is referred to as trace information. For this purpose, the debug resources DR monitor for conditions that can be predefined from outside the program-controlled unit occurring within the core of the program-controlled unit, and whenever the condition or one of the conditions is fulfilled, addresses, data and/or control signals, which can be predefined from outside the program-controlled unit, are output from the program-controlled unit without interrupting the operation of the program-controlled unit. As a result it is possible, for example, but by far not exclusively possible, for the debug resources DR to output the data that is then fed to the core from the program-controlled unit whenever the core wishes to read data from a specific address or a specific address area.

In general, the debug resources DR also carry out further actions which are necessary or helpful for localizing and remedying faults which occur in the program-controlled unit. As a result, the debug resources DR are, for example, capable of stopping the program-controlled unit when specific conditions occur, for example when a specific program counter reading is reached, and reading out or changing the contents of registers of interest.

Such debug resources, also referred to as On-Chip Debug Support (OCDS) modules, are known, so further details will not be described.

Owing to the increasing significance of the presence of debug resources in program-controlled units, a standard which is referred to as "The Nexus 5001 Forum Standard for a Global Embedded Processor Debug Interface" was defined for the corresponding interface (e.g., interface SS) in 1999 by the IEEE Industry Standards and Technology Organization (IEEE-ISTO), by means of which interface the debug resources can exchange data particularly efficiently with a analyzing device (e.g., a workstation) that is provided outside the program-controlled unit, for example with a debug control unit or emulation control unit, or with a measuring device such as, for example, a logic analyzer.

The debug resources and the NEXUS interface make it possible to detect and remedy faults occurring in program-controlled units with a relatively small amount of expenditure.

Nevertheless, the design and the operation of the debug resources DR can be very costly and complicated, especially in the case of relatively complex program-controlled units, for example in the case of program-controlled units with multiple cores. It is problematic here in particular to acquire and output the trace information: it may be necessary for a very large quantity of trace information to have to be output from the program-controlled unit in order to be able to localize and remedy faults occurring in the program-controlled unit, and furthermore it may also prove very complicated or even impossible to define the conditions whose occurrence determines the outputting of trace information.

What is needed is a program-controlled unit that facilitates efficient trace (e.g., debugging) operations while minimizing the amount of chip area required for on-chip debugging resources.

SUMMARY OF THE INVENTION

The present invention is therefore based on the object of finding a possible way of minimizing the quantity of trace information generated during a trace (e.g., debugging) operation in order to be able to localize and remedy faults occurring in the program-controlled unit.

According to an embodiment of the present invention, a program-controlled unit identifies trace information, which is then output or stored and/or the time when the trace information is output or stored is/are determined at least partially by the program that is executed by the program-controlled unit, and the trace information is combined with an associated identification code that is output with the trace information from the program-controlled unit. This arrangement proves advantageous in two ways:

First, it is possible using this arrangement to obtain trace information that could not be output due to the failure of addresses, data and/or control signals, which represent the information to be present in the core, or due to the lack of access possibilities to them by the known debug resources, and, if at all, could be determined by evaluating trace information that is output by the debug resources, and in this context it is possible for there to be a considerable amount of trace information that is to be made available and evaluated for this purpose. Examples of such information are intermediate results or the number of passes through loops that do not have any loop counters, the number of calls of a specific subprogram, etc.

On the other hand, when trace information is output or stored at the instigation of instructions, it is possible for trace information to be output or stored exclusively during the execution of program sections in which the faults to be localized and remedied are suspected to be present.

By means of the aforesaid points it is possible to ensure that only trace information that is actually of interest, and consequently also only the absolutely necessary quantity of trace information is output from the program-controlled unit or stored in it.

The present invention also avoids the need for conventional debug resources, or enhanced debug resources, to facilitate effective trace operations. If such debug resources are provided on the program-controlled unit in addition to the features associated with the present invention, they can be of simpler design and operated more easily than was previously the case as of course there are other possible ways of bringing about the outputting or storage of trace information.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention pertains to a program-controlled unit, and more particularly to debug resources provided on a program-controlled unit. In the description provided below, the present invention is described with reference to a microcontroller, which represents a particular type of program-controlled unit. The novel aspects of the microcontroller described below, and to be more precise the novel aspects of the debug resources that are provided therein as described below, can however also be used with any other type of program-controlled unit.

Figure 1:
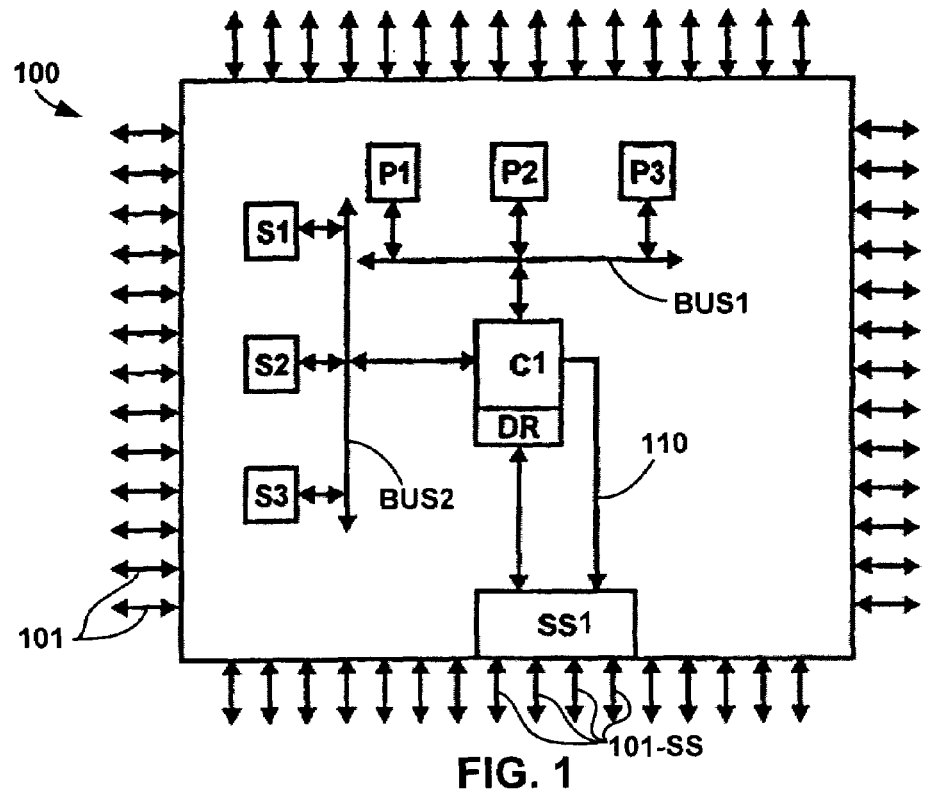
FIG. 1 is a simplified block diagram showing a program-controlled unit according to an embodiment of the present invention.

FIG. 1 is a simplified block diagram showing a microcontroller 100 according to an embodiment of the present invention. For the sake of completeness it is to be noted that only components of the program-controlled unit that are of particular interest here are shown in FIG. 1 and described below.

Figure 2:
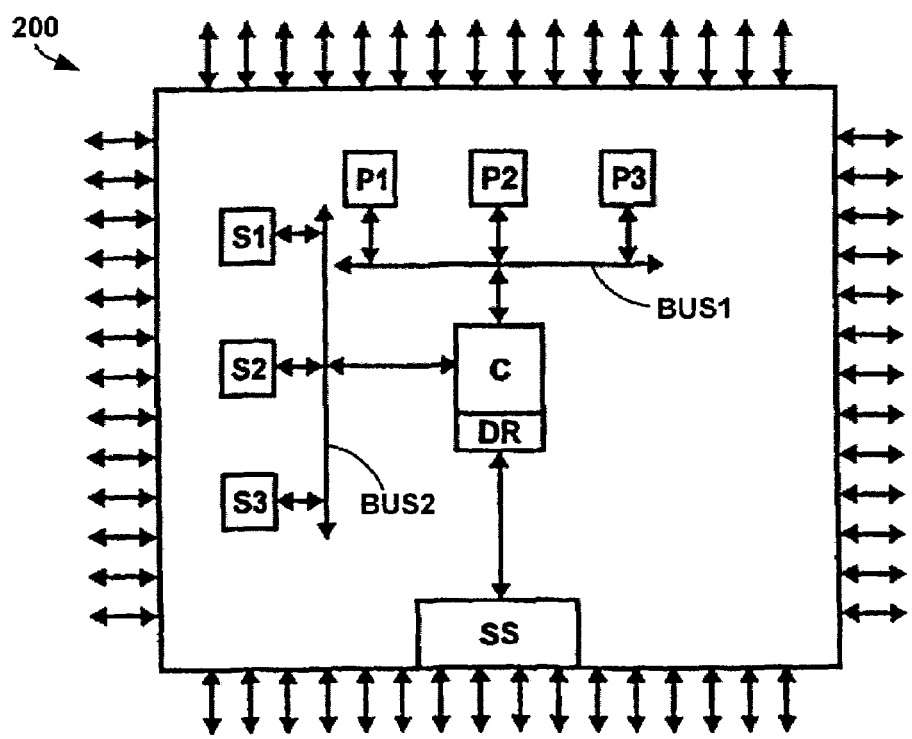
FIG. 2 is a simplified block diagram showing a conventional program-controlled unit.

Microcontroller 100 is similar to program-controlled unit 200 (FIG. 2), described above, and components of microcontroller 100 that are designated with the same reference symbols as components associated with program-controlled unit 200 are understood to be substantially the same or similar components. Note that microcontroller 100 includes multiple "standard" input/output (I/O) pins 101 (indicated by double-headed arrows) for transmitting program instruction, control, and data signals between microcontroller 100 and external system components (not shown) during "normal" operation of microcontroller 100. Microcontroller 100 also includes one or more "special" I/O pins 101-SS that are coupled to interface SS1 for transmitting, for example, trace information between microcontroller 100 and an external debugging system (not shown) during trace (e.g., debugging) operations. Note that in some embodiments special I/O pins 101-SS may be used during "normal" operation as well.

For the sake of completeness it is noted that the interface SS1 is an interface circuit that is constructed according to the NEXUS standard, mentioned above. However, those skilled in the art would recognize that another suitable interface circuit, for example a JTAG Boundary-Scan interface circuit produced in accordance with IEEE Standard 1149.1, could be used in place of the NEXUS standard interface circuit described herein.

According to an aspect of the present invention, microcontroller 100 differs from program-controlled unit 200 (FIG. 2) in that microcontroller 100 includes a connection (bus) 110 between a core C1 and the interface SS1. Connection 110 makes it possible for the core C1 to transmit data (trace information) directly to the interface SS1, thereby facilitating the direct transmission of core-generated data through the interface SS1 to external systems (e.g., workstations) for debugging purposes. This data, which is output to the interface SS1 from the core C1, and/or trace information transmitted from the debug resources DR to interface SS1, is subjected to an optional data treatment (conversion), e.g., into NEXUS messages, and then output from microcontroller 100 via special I/O pins 101-SS.

In one embodiment of the present invention, the data (trace information) transferred from the core C1 to the interface SS1 is selected according to corresponding trace instructions that are inserted into the program (code) that is executed by microprocessor core 100 (i.e., the program that is to be debugged during the trace operation). In one embodiment, the inserted trace instructions are "normal"

mov instructions. In another embodiment, the inserted trace instructions are specially provided for this purpose.

The trace information that is transmitted in response to the trace instructions from the core C1 to the interface SS1, and from the interface SS1 to an external debugging system (not shown) over special I/O pins 101-SS, may include any desired information that is useful for the detection, localization and/or remedying of faults occurring in microcontroller 100. For example, in one specific embodiment, the trace information may include values of specific variables utilized in the executed code (software program), or results or intermediate results of calculations performed by the core C1.

According to another aspect of the present invention, messages that are generated by the interface SS1 and transmitted over special I/O pins 101-SS in such a way that makes it possible to determine from the message the content of the trace information. In particular, each discrete portion of trace information (e.g., byte of data) transmitted over connection 110 from core C1 to interface SS1 is assigned a corresponding identification code value, which is then transmitted with the trace information portion via special I/O pins 101-SS to the external debugging system. These identification codes are assigned predetermined values that identify corresponding trace information that is of interest during the debugging process. For example, prior to the trace (debugging) operation, identification code value may be assigned to indicate the value of a variable A, a specific property of a variable B, the number of passes through a particular loop executed within the program, or a value indicating the number of times a specific subprogram has been executed. In one specific example, the identification code transmitted with each corresponding trace information portion is four bits in length, but those skilled in the art will recognize that the identification code can be longer or shorter than four bits. According to another aspect of the present invention, core C1 is modified to transmit the corresponding trace information onto conductor 101, for example, each time the corresponding trace information is processed (e.g., changed or otherwise called) by the core C1 during execution of the software program being debugged. By assigning such four-bit identification code values to each of these trace information items prior to the trace operation, and by causing microprocessor 100 to transmit these identification codes along with the associated trace information to the external debugging system through special I/O pins 101-SS, the present invention provides an efficient method for processing trace information that minimizes the complexity (and, hence, the size) of the on-chip debugging resources. That is, by pre-assigning each four-bit identification code to a corresponding portion of trace information, it is possible for the external debugging system to efficiently determine the significance of the transmitted trace information. This determination merely requires that the debugging system be programmed to correlate each identification code value (a total of sixteen different code values in the example under consideration) with its corresponding trace information type. That is to say it is necessary to specify, for example: that the data byte transmitted together with the identification code value 0000 represents the value of a variable A; that the data byte transmitted together with the identification code value 0001 indicates whether a variable B is larger or smaller than a specific threshold value; that the data byte transmitted together with the code value 0010 indicates the number of times a specific loop has been executed; etc.

According to another aspect of the present invention, the identification code value, together with the trace information (e.g., data byte) that is transmitted to the interface SS1 from the core C1, is ultimately determined by the core C1, and to be more precise by the executed instruction that generates the trace information transmission on conductor 101 to the interface SS1.

Those skilled in the art will recognize that the code output from microcontroller 100 (specifically from interface SS1 onto I/O pins 101-SS) with the corresponding trace information may be generated in a number of ways. In one embodiment, the core C1 transmits both the trace information (e.g., data byte) and a corresponding code value, which specifies the meaning of the trace information, to the interface SS1 on conductor 110. In one specific embodiment, the interface SS1 receives the trace information (data) and the corresponding identification code value, and then passes the trace information (data) and corresponding identification code value in an unaltered form to an external debugging system via interface pins 101-SS (i.e., core C1 generates the code-value that is ultimately transmitted from microprocessor 100 to the external debugging system). Alternatively, it is also possible for the identification code generated by the core C1 to be altered or otherwise modified by interface SS1 before being transmitted to the external debugging system.

According to another embodiment of the present invention, instead of tasking the core C1 to generate a code value each time trace information is passed on conductor 110, the core C1 may be modified to transmit predetermined trace information to corresponding locations within the interface SS1, and the interface SS1 modified to generate a code value on I/O pins 101-SS according to the location at which the trace information is received from the core C1. In this case, the program causes, for example: data whose content is the value of a variable A to be transferred into a register X0 of the interface SS1; data whose content indicates whether a variable B is larger than a specific threshold value to be transferred into a register X1 of the interface SS1; etc. Based on the register in which trace information is received, the interface SS1 then generates a corresponding identification code that is transmitted with the received trace information onto I/O pins 101-SS. For example: the code 0000 can be added to the data which is present in the register X0; the code 0001 can be added to the data which is present in the register X1; etc.

The use of registers as buffers for the trace information that is output by the core C1 proves advantageous because no additional data transfers via the system buses BUS1 and BUS2 have to take place as a result of this trace information output operation. In principle, the trace information can also be buffered in any other desired storage device, this storage device not necessarily being a component of the interface SS1.

The messages generated by the interface circuits in response to the trace information (data) obtained from a microprocessor core are typically referred to as a vendor defined message. According to the present invention, the vendor defined message generated by microprocessor 100 (i.e., interface SS1) includes a header (comprising six bits), and a data portion including the trace information (data) obtained from core C1, and the identification code indicating the meaning of the associated trace information.

By virtue of the fact that the trace information that is to be output is at least partially specified by the program executed by the program-controlled unit, it is possible to minimize the amount of trace information that has to be output in order to facilitate localizing and remedying faults (bugs or unintended system failures) that occur during execution of the program. Using conventional debug resources it is either not possible at all to restrict the output trace information to the trace information whose outputting is brought about by the core C1 in the case of microcontroller 100, which is described above, or only possible to do so at immense cost.

Furthermore, the conditions under which the core C1 transmits trace information to the interface SS1 may be as complicated as desired. In contrast, in conventional program-controlled units, the complexity of the conditions under which trace information is output from the program-controlled unit is restricted by the number and the interconnection of the comparators and comparison masks that are present in the debug resources.

Irrespective of this, the generation of trace information by the core C1 makes it possible to simplify the debug resources. In particular, the number of comparators and comparison masks that are to be provided for the comparison of addresses, data and control signals can be reduced. If the outputting of trace information is to be made dependent on more complex conditions, it is of course possible for trace information to be generated by means of the program that is executed by microcontroller 100.

The instructions by means of which the transmission of trace information to the interface SS1 is brought about during the debugging operation are preferably also contained in the program that is executed on microcontroller 100, if no debug process takes place. That is to say, the program that is executed during the debugging operation is preferably precisely the program that is also executed during the normal operation of the program-controlled unit. As a result it is possible to ensure that during the debugging operation microcontroller 100 behaves precisely as it otherwise does. Additionally, or alternatively, it is also possible for the program that is executed by the program-controlled unit to check "only" the conditions under which trace information is to be output or to be stored, and that if it is determined that the condition is fulfilled during the execution of the instructions that check the condition, the debug resources DR are made to output the corresponding trace information.

It is also possible for the program that is executed by the core C1 to "only" specify which trace information is to be output, or to be stored, when a specific condition occurs, and for the debug resources DR to be made to output this information. In this context, the checking of the condition under which the outputting of this trace information has to take place can be carried out either by the debug resources DR or by the program that is executed by the core C1 (or by some other device).

The core C1 is preferably constructed in such a way that trace operations do not require their own clock cycle for the execution of the instructions that bring about the transmission of trace information to the interface SS1. This may be carried out, for example, by virtue of the fact that a separate execution unit is reserved for these instructions.

It may also prove advantageous if monitoring is carried out in the interface SS1 to determine whether the storage devices into which the core C1 and/or the debug resources write the trace information that is to be output from microcontroller 100 overflow (i.e., whether new trace information is written over trace information that has not yet been output on I/O pins 101-SS, or new trace information cannot be accepted owing to a lack of storage space). If it is determined that this is occurring (or risks occurring_, measures are preferably taken which prevent this, or which inform the external device to which the trace information is output. This may be carried out, for example, by stopping the code transmission if the aforesaid storage devices are no longer capable of accepting data, or by transmitting a fault message to the external device that signals the loss of trace information.

In the aforesaid case it is possible to provide for the external device to be provided with the number and the type of trace information that has been lost.

The generation of program-controlled trace information does not require debug resources DR to be additionally provided. However, it is generally proven advantageous if the program-controlled unit comprises debug resources. However, these debug resources may be of simpler and smaller design than debug resources in conventional program-controlled units (without the generation of program-controlled trace information).

As a result of the generation of program-controlled trace information it is possible, irrespective of the details of the practical implementation, for the quantity of trace information, which has to be output in order to be able to localize and remedy faults occurring in the program-controlled unit, thereby minimizing the cost associated with the debugging resources.

Although the present invention has been described with respect to certain specific embodiments, it will be clear to those skilled in the art that the inventive features of the present invention are applicable to other embodiments as well, all of which are intended to fall within the scope of the present invention.

We claim:

1. A program-controlled unit comprising:
   means for processing a plurality of instructions associated with a software program,
   means for generating one or more trace information portions, wherein each trace information portion includes at least one of selected address values, data values and control signals generated in said program-controlled unit;
   means for generating an identification code for each generated trace information portion, wherein each identification code has a value corresponding to a characteristic of the associated trace information portion; and
   means for outputting the generated trace information portion with its associated identification code from the program-controlled unit,
   wherein each trace information portion corresponds to a data value associated with a predetermined variable, and wherein said identification code generating means generates said corresponding identification code such that the corresponding identification code has a value corresponding to the predetermined variable.

2. The program-controlled unit according to claim 1, wherein the processing means comprises a core, wherein the means for outputting the generated trace information portions comprises an interface circuit, and wherein the program-controlled unit further comprises a conductor connected between the core and the interface circuit for transmitting the generated trace information portions directly to the interface circuit.

3. The program-controlled unit according to claim 2, wherein the core includes said means for generating the associated identification code for each trace information portion, and for transmitting each trace information portion with its corresponding identification code to the interface circuit on the conductor.

4. The program-controlled unit according to claim 3, wherein the interface circuit includes means for transmitting the trace information portion with its corresponding identification code to associated input/output pins of the program-controlled unit.

5. The program-controlled unit according to claim 3, wherein the interface circuit includes: means for converting each identification code to an associated modified identification code, and means for transmitting the trace information portion with its corresponding modified identification code to associated input/output pins of the program-controlled unit.

6. The program-controlled unit according to claim 2, wherein the core includes means for identifying a characteristic of each said-trace information portion, and for transmitting said each trace information portion to a corresponding predetermined register of the interface circuit according to the identified characteristic, and wherein the interface circuit comprises said means for generating said corresponding identification code for said each transmitted trace information portion according to the corresponding predetermined register in which said each transmitted trace information portion is received.

7. The program-controlled unit according to claim 2, wherein the software program that is executed by the core includes trace operation instructions, and wherein the program-controlled unit further comprises means for identifying the trace operation instructions, and for transmitting said trace information portions to said interface circuit in response to the identified trace operation instruction.

8. The program-controlled unit according to claim 1, wherein said means for outputting comprises a memory device for receiving and storing the generated trace information portions and the associated identification codes such that each trace information portion and associated identification code are stored in a corresponding field of the memory device.

9. The program-controlled unit according to claim 1, wherein the program-controlled unit comprises debug resources for generating trace information portions, wherein the trace information portions represent one of a selected state and a selected process within the program-controlled unit.

10. The program-controlled unit according to claim 9, wherein the software program executed by the program-controlled unit includes instructions by means of which a condition in whose presence trace information is to be output or stored is checked, and in that if it is determined during the execution of these instructions that the condition which is to be checked is fulfilled, this state is signaled to the debug resources.

11. The program-controlled unit according to claim 9, wherein the software program that is executed by the program-controlled unit comprises instructions by means of which the debug resources can be made to output or store trace information.

12. The program-controlled unit according to claim 9, wherein the software program that is executed by the program-controlled unit comprises instructions by means of which a setting determining which trace information is to be output or stored can be made in the debug resources.

13. A program-controlled unit comprising:
a processor that processes a plurality of instructions associated with a software program,
a trace information generator that generates one or more trace information portions, wherein each trace information portion includes at least one of selected address values, data values and control signals;
an identification code generator that generates an identification code for each generated trace information portion, wherein each identification code has a value corresponding to a characteristic of the associated trace information portion; and
an output circuit that outputs each of the generated trace information portion with its associated identification code,
wherein each trace information portion corresponds to a data value associated with a predetermined variable, and said identification code generator generates said corresponding identification code such that it has a value corresponding to the predetermined variable.

14. The program-controlled unit according to claim 13, wherein the processor comprises a core and the output circuit comprises an interface circuit, and wherein
the program-controlled unit further comprises a conductor connected between the core and the interface circuit that transmits the generated trace information portions directly to the interface circuit.

15. The program-controlled unit according to claim 14, wherein the core includes said trace information generator, said trace information generator further transmitting each trace information portion with its corresponding identification code to the interface circuit.

16. The program-controlled unit according to claim 15, wherein the interface circuit includes a transmitter that transmits the trace information portion with its corresponding identification code to associated input/output pins of the program-controlled unit.

17. The program-controlled unit according to claim 15, wherein the interface circuit comprises:
a convertor that converts each identification code to an associated modified identification code; and
a transmitter that transmits the trace information portion with its corresponding modified identification code to associated input/output pins of the program-controlled unit.

18. The program-controlled unit according to claim 14, wherein the core further comprises:
an identifier that identifies a characteristic of each of said trace information portions and transmitting said each of said trace information portions to a corresponding predetermined register of the interface circuit according to the identified characteristic; and wherein
the interface circuit comprises said identification code generator that generates said corresponding identification code for said each transmitted trace information portion according to the corresponding predetermined register in which said each transmitted trace information portion is received.

19. The program-controlled unit according to claim 14, wherein the software program executed by the core includes trace operation instructions, and the program-controlled unit further comprises means for identifying the trace operation instructions and for transmitting said trace information portions to said interface circuit in response to the identified trace operation instruction.

20. The program-controlled unit according to claim 13, wherein said output circuit comprises a memory device such that each trace information portion and associated identification code are stored in a corresponding field of the memory device.

21. The program-controlled unit according to claim 13, wherein the program-controlled unit comprises debug resources that generate said trace information portions and the trace information portions represent one of a selected state and a selected process within the program-controlled unit.

22. The program-controlled unit according to claim 21, wherein the software program executed by the program-controlled unit includes instructions to check conditions for outputting or storing the trace information, and if it is determined during the execution of the instructions that a condition to be checked is fulfilled, this state is signaled to a debug resource.

23. The program-controlled unit according to claim 21, wherein the software program that is executed by the program-controlled unit comprises instructions for the debug resources to output or store trace information.

24. The program-controlled unit according to claim 21, wherein the software program executed by the program-controlled unit comprises instructions by means of which a setting determining which trace information is to be output or stored is made in the debug resources.

25. A microcontroller adapted to process program instructions, the microcontroller comprising:
 a core adapted to transmit first trace information in response to the program instructions;
 a debug resource adapted to monitor conditions and output second trace information;
 an interface connected to the debug resource via which the debug resource outputs the second trace information; and
 a data bus connecting the core directly to the interface for outputting the first trace information.

* * * * *